(12) United States Patent
Jeong et al.

(10) Patent No.: US 10,197,307 B2
(45) Date of Patent: Feb. 5, 2019

(54) AIR CONDITIONER WITH OIL LEVEL CONTROL FOR BOTH GAS AND ELECTRIC HEAT PUMP CYCLES

(71) Applicant: LG ELECTRONICS INC., Seoul (KR)

(72) Inventors: Hojong Jeong, Seoul (KR); Kwangho Shin, Seoul (KR); Minho Chung, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 14/991,216

(22) Filed: Jan. 8, 2016

(65) Prior Publication Data

US 2016/0201951 A1    Jul. 14, 2016

(30) Foreign Application Priority Data

Jan. 12, 2015    (KR) .................. 10-2015-0004177

(51) Int. Cl.
*F25B 43/02*    (2006.01)
*F25B 13/00*    (2006.01)
(Continued)

(52) U.S. Cl.
CPC ............. *F25B 13/00* (2013.01); *F25B 27/00* (2013.01); *F25B 31/002* (2013.01); *F25B 49/02* (2013.01);
(Continued)

(58) Field of Classification Search
CPC ............... F25B 27/00; F25B 31/002; F25B 2313/0253; F25B 2327/001; F25B 2500/16; F25B 2700/03
See application file for complete search history.

(56) References Cited

U.S. PATENT DOCUMENTS

| | | | | |
|---|---|---|---|---|
| 2008/0034777 | A1* | 2/2008 | Copeland | ............... F25B 13/00 62/323.1 |
| 2010/0126211 | A1* | 5/2010 | Okamoto | .............. F25B 31/004 62/470 |

(Continued)

FOREIGN PATENT DOCUMENTS

| | | |
|---|---|---|
| JP | 2013108649 A | 6/2013 |
| KR | 10-1340532 B1 | 12/2013 |

(Continued)

OTHER PUBLICATIONS

JP 2011-075162 (English Translation).*

*Primary Examiner* — Jonathan Bradford
(74) *Attorney, Agent, or Firm* — Dentons US LLP

(57) ABSTRACT

Provided is an air conditioner including at least one indoor unit; an EHP outdoor unit connected with the at least one indoor unit, and configured to control an applied current and drive an EHP compressor; a GHP outdoor unit connected with the at least one indoor unit and including a GHP compressor configured to operate using power from an engine driven through a combustion gas and an oil separator provided at an outlet side of the GHP compressor; an oil level sensor provided at the EHP outdoor unit or the GHP outdoor unit and configured to detect an amount of oil; and a control part configured to control an RPM of the EHP compressor or the GHP compressor based on information detected by the oil level sensor.

20 Claims, 5 Drawing Sheets

(51) Int. Cl.
*F25B 27/00* (2006.01)
*F25B 31/00* (2006.01)
*F25B 49/02* (2006.01)
F25B 27/02 (2006.01)
F25B 40/06 (2006.01)

(52) U.S. Cl.
CPC .............. *F25B 27/02* (2013.01); *F25B 40/06* (2013.01); *F25B 2313/021* (2013.01); *F25B 2313/0253* (2013.01); *F25B 2327/001* (2013.01); *F25B 2500/16* (2013.01); *F25B 2600/021* (2013.01); *F25B 2600/13* (2013.01); *F25B 2600/2513* (2013.01); *Y02A 30/274* (2018.01); *Y02B 30/741* (2013.01); *Y02B 30/745* (2013.01)

(56) References Cited

U.S. PATENT DOCUMENTS

| | | | | |
|---|---|---|---|---|
| 2011/0138831 A1* | 6/2011 | Ogata | ........................ | F25B 9/06 62/193 |
| 2011/0239667 A1* | 10/2011 | Won | ..................... | F25B 31/004 62/84 |
| 2014/0116673 A1* | 5/2014 | Kang | .................... | B60H 1/004 165/222 |

FOREIGN PATENT DOCUMENTS

| | | | |
|---|---|---|---|
| KR | 10-1397897 B1 | 5/2014 | |
| KR | 1020140052339 A | 5/2014 | |
| WO | WO 2008073955 A2 * | 6/2008 | ............ F25B 31/002 |

* cited by examiner

AIR CONDITIONER WITH OIL LEVEL CONTROL FOR BOTH GAS AND ELECTRIC HEAT PUMP CYCLES

CROSS-REFERENCE TO RELATED APPLICATION(S)

This application claims priority under 35 U.S.C. § 119 to Korean Application No. 10-2015-0004177, filed in Korea on Jan. 12, 2015, whose entire disclosure is hereby incorporated by reference.

BACKGROUND

1. Field

An air conditioner and a method for controlling the same are disclosed herein.

2. Background

An air conditioner is an apparatus which cools or warms an interior, or purifies indoor air to provide a comfortable indoor environment to a user.

The air conditioner may be classified into an electric heat pump (EHP) type using electric power, and a gas heat pump (GHP) type using a gas fuel such as LPG and LNG according to a power source for driving a compressor. Here, in the GHP type, an engine is operated by burning the gas fuel, and thus the compressor is driven.

An EHP type air conditioner has an advantage that a compressor can be easily controlled through a current control, and thus it is easy to respond to a partial load. A GHP type air conditioner has an advantage that the engine is operated using the gas fuel such as LPG and LNG, and thus it is not affected by a power supply.

Meanwhile, the air conditioner may include an air conditioner in which the EHP type and the GHP type are combined. Such an air conditioner may be referred to as a "combination air conditioner"

However, in the combination air conditioner, since a compressor provided at an EHP device and a compressor provided at a GHP device have different structures from each other, it is difficult to adjust an oil balance in each of the compressors. Also, since the GHP type compressor is a horizontal type lower pressure compressor, there is a disadvantage that an oil storage space is insufficient in the horizontal type lower pressure compressor.

SUMMARY

The present discloser is directed to a method for controlling an air conditioner, which maintains an oil balance between a compressor in an outdoor unit according to an EHP type and a compressor in an outdoor unit according to a GHP type.

According to an aspect of the present discloser, there is provided an air conditioner including at least one indoor unit; an EHP outdoor unit connected with the at least one indoor unit, and configured to control an applied current and drive an EHP compressor; a GHP outdoor unit connected with the at least one indoor unit and including a GHP compressor configured to operate using power from an engine driven through a combustion gas and an oil separator provided at an outlet side of the GHP compressor; an oil level sensor provided at the EHP outdoor unit or the GHP outdoor unit and configured to detect an amount of oil; and a control part configured to control an RPM of the EHP compressor or the GHP compressor based on information detected by the oil level sensor.

The oil level sensor may include a first oil level sensor installed at the EHP compressor, and a second oil level sensor installed at the oil separator.

The control part may calculate an amount of oil stored in the GHP compressor based on an amount of oil detected by the second oil level sensor.

When an amount of oil detected by the first oil level sensor is the same as or less than a first predetermined value, and an amount of oil detected by the second oil level sensor is the same as or more than a second predetermined value, the control part may increase the RPM of the EHP compressor, and may reduce the RPM of the GHP compressor.

An increase in the RPM of the EHP compressor may be the same as a reduction in the RPM of the GHP compressor.

When an amount of oil detected by the first oil level sensor is the same as or more than a first predetermined value, and an amount of oil detected by the second oil level sensor is the same as or less than a second predetermined value, the control part may increase the RPM of the GHP compressor, and may reduce the RPM of the EHP compressor.

An increase in the RPM of the GHP compressor may be the same as a reduction in the RPM of the EHP compressor.

The GHP outdoor unit may further include a waste heat recovery heat exchanger in which cooling water circulated in the engine is heat-exchanged with a refrigerant suctioned into the GHP compressor, a cooling water pipe configured to guide a circulation of the cooling water, and a cooling water pump installed at the cooling water pipe.

The control part may drive the cooling water pump, while the RPM of the GHP compressor is increased, such that the cooling water is heat-exchanged with the refrigerant in the waste heat recovery heat exchanger.

The GHP outdoor unit may further include an outdoor heat exchanger in which a refrigerant is heat-exchanged with air by an outdoor fan, and a radiator installed at one side of the outdoor heat exchanger and in which cooling water is heat-exchanged with the air.

The GHP outdoor unit may further include an auxiliary heat exchanger in which a refrigerant flowing to the outdoor heat exchanger is heat-exchanged with the cooling water.

The GHP compressor may include a horizontal type low-pressure compressor.

According to another aspect of the present discloser, there is provided a method for controlling an air conditioner in which an EHP outdoor unit having an EHP compressor using an electric motor as a driving source, and a GHP outdoor unit having a GHP compressor using an engine as the driving source are each connected with an indoor unit, the method including driving the EHP compressor and the GHP compressor; measuring an amount of oil in each of the EHP compressor and the GHP compressor; and controlling an RPM of each of the EHP compressor and the GHP compressor based on the measured amount of the oil.

The controlling of the RPM may include reducing an RPM of the electric motor and increasing an RPM of the engine when the amount of the oil in the EHP compressor is normal and the amount of the oil in the GHP compressor is insufficient.

The method may further include transferring heat generated from the engine to a refrigerant suctioned into the GHP compressor.

The controlling of the RPM may include increasing an RPM of the electric motor and reducing an RPM of the engine when the amount of the oil in the EHP compressor is insufficient and the amount of the oil in the GHP compressor is normal.

The controlling of the RPM may include increasing an RPM of the electric motor and increasing an RPM of the engine when the amount of the oil in the EHP compressor is insufficient and the amount of the oil in the GHP compressor is insufficient.

BRIEF DESCRIPTION OF THE DRAWINGS

Embodiments will be described in detail with reference to the following drawings in which like reference numerals refer to like elements, and wherein.

DETAILED DESCRIPTION

Figure 1:
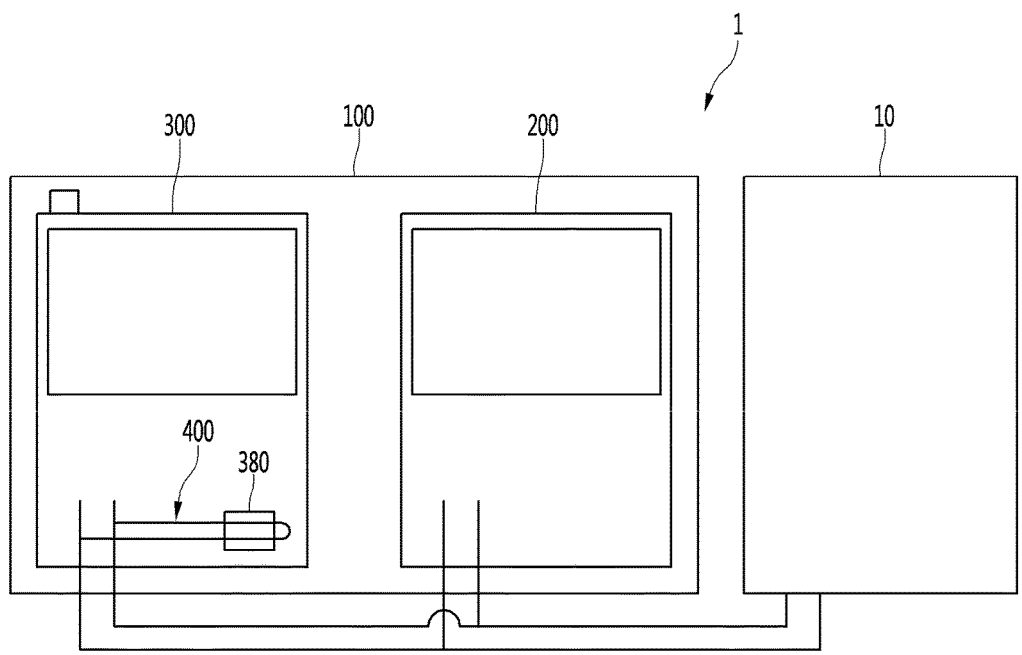
FIG. 1 is a view illustrating a structure of an air conditioner according to one embodiment of the present discloser.

Hereinafter, exemplary embodiments of the present discloser will be described in detail with reference to the accompanying drawings. In the drawings, the same components are designated by the same reference numerals, even though they are depicted in different drawings. In the following description, if it is considered that the specific description of the related and noticed functions or structures may obscure the gist of the present discloser, the specific description will be omitted.

Figure 2:
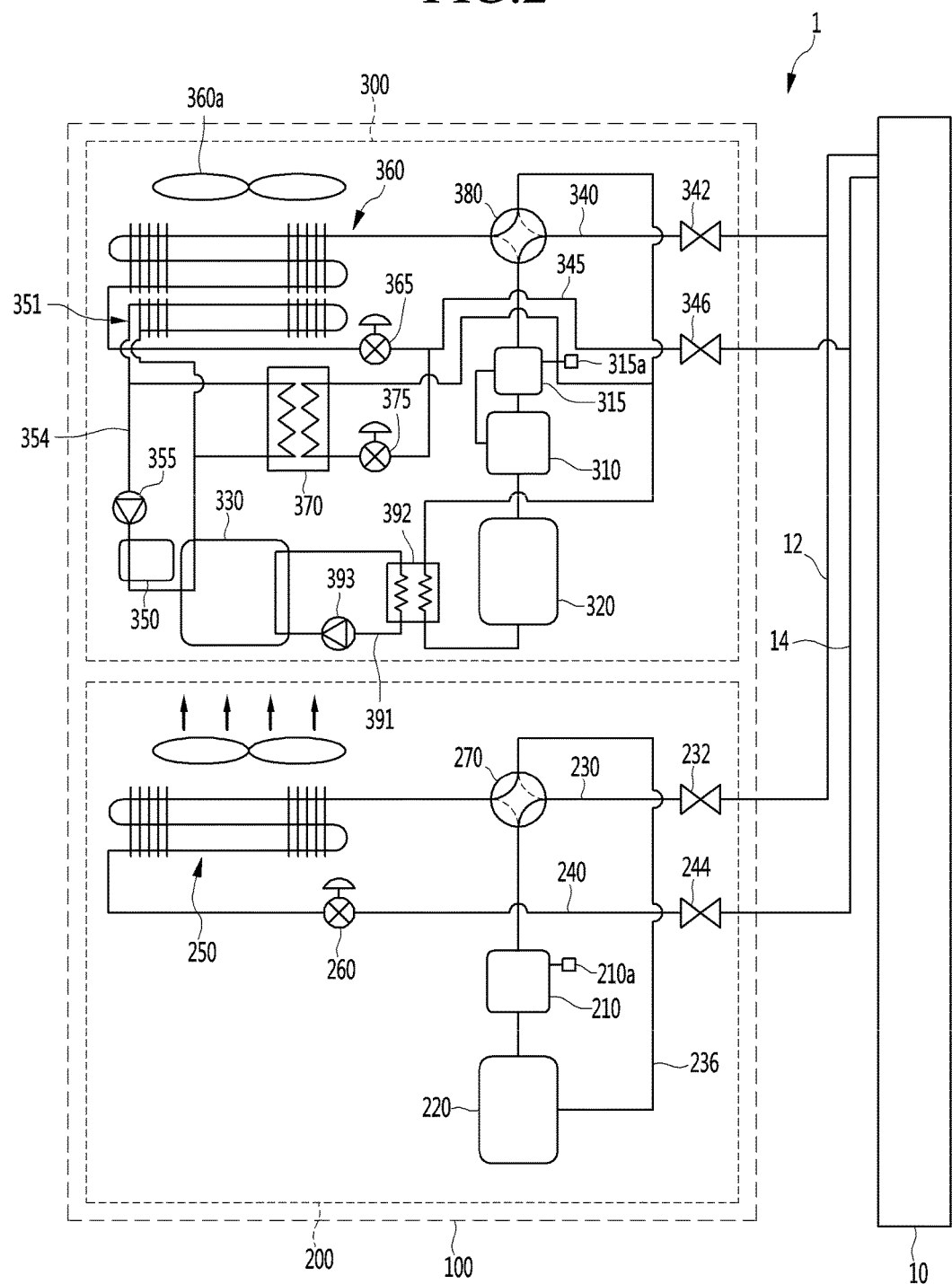
FIG. 2 is a view illustrating a detailed structure of the air conditioner of FIG. 1.
Figure 3:
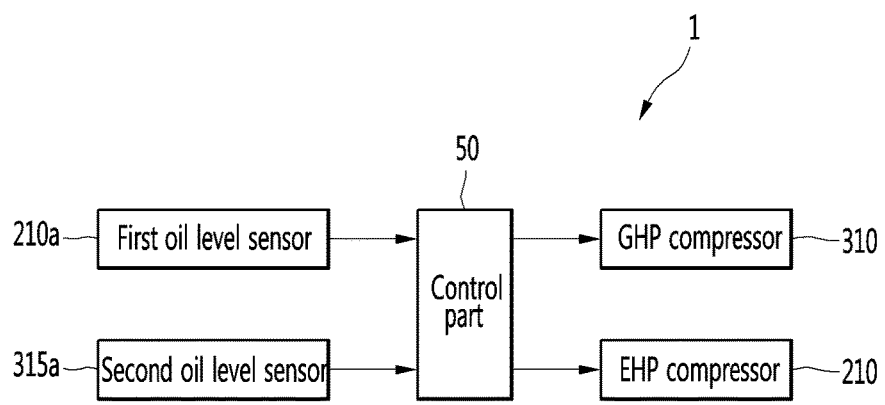
FIG. 3 is a block diagram illustrating a configuration of the air conditioner according to one embodiment of the present discloser.

FIG. 1 is a view illustrating a structure of an air conditioner according to one embodiment of the present discloser, FIG. 2 is a view illustrating a detailed structure of the air conditioner of FIG. 1, and FIG. 3 is a block diagram illustrating a configuration of the air conditioner according to one embodiment of the present discloser.

Referring to FIGS. 1 and 2, the air conditioner 1 includes an indoor unit 10 and an outdoor unit 100.

One or a plurality of indoor units 10 may be provided. That is, at least one or more indoor units 10 may be provided. The at least one indoor unit 10 may be connected with the outdoor unit 100, and may cool or warm an interior, or may purify indoor air.

The indoor unit 10 includes one pair of indoor unit pipes 12 and 14 for connection with the outdoor unit 100. The pair of indoor unit pipes 12 and 14 includes an indoor unit gas pipe 12 which connects an EHP gas pipe 230, which will be described later, with a GHP gas pipe 340, and an indoor unit liquid pipe 14 which connects an EHP liquid pipe 240, which will be described later, with a GHP liquid pipe 345.

The outdoor unit is connected with the indoor unit 10, and performs a compression process, an expansion process or the like of a refrigerant to allow a sufficient heat exchange operation of the indoor unit 10. A plurality of outdoor units 100 may be provided. However, hereinafter, for convenience of explanation, an example in which one pair of outdoor units 100 are provided will be described.

The pair of outdoor units 100 may include an EHP outdoor unit 200 which is operated in an electric heat pump (EHP) method using electric power, and a GHP outdoor unit 300 which is operated in a gas heat pump (GHP) method using a gas fuel such as LPG and LNG.

The EHP outdoor unit 200 is an outdoor unit which is operated in the EHP method, and includes an EHP compressor 210, a first accumulator 220, the EHP gas pipe 230, the EHP liquid pipe 240, one pair of connection valves 232 and 244, a first outdoor heat exchanger 250, a first outdoor heat exchanger control valve 260 and a first four-way valve 270.

The EHP compressor 210 is an element for compressing a refrigerant, and is driven by applying a current and operating an electric motor (not shown). When the current is applied to the EHP compressor 210, the EHP compressor 210 may compress the refrigerant.

The EHP compressor 210 may include an inverter compressor having an inverter which is able to control a frequency of the current applied to the EHP compressor 210. Accordingly, the inverter compressor may control an operation frequency according to an increase and decrease in an operation load, and may respond to the operation load. Although not shown in the drawings, the EHP compressor 210 may be configured so that two inverter compressors are disposed in parallel.

The first accumulator 220 is an element for supplying a gaseous refrigerant to the EHP compressor 210. Specifically, the first accumulator 220 separates the gaseous refrigerant from the introduced refrigerant, and supplies the gaseous refrigerant to the EHP compressor 210, and may also temporarily store a mixture of oil and a liquid refrigerant. The liquid refrigerant may be prevented from being suctioned into the EHP compressor 210 by the first accumulator 220.

The EHP gas pipe 230 connects the EHP compressor 210 with the at least one indoor unit 10. Specifically, the EHP gas pipe 230 connects the EHP compressor 210 with the indoor unit gas pipe 12.

The EHP liquid pipe 240 connects the first outdoor heat exchanger 250 with the at least one indoor unit 10. Specifically, the EHP liquid pipe 240 connects the first outdoor heat exchanger 250 with the indoor unit liquid pipe 14.

The pair of connection valves 232 and 244 are elements for connection with the indoor unit 10. The pair of connection valves 232 and 244 include a connection valve 232 which connects the EHP gas pipe 230 with the indoor unit gas pipe 12, and a connection valve 244 which connects the EHP liquid pipe 240 with the indoor unit liquid pipe 14.

In the first outdoor heat exchanger 250, the refrigerant is evaporated or condensed according to a cooling and heating operation of the air conditioner 1. Specifically, when the air conditioner 1 performs the cooling operation, the refrigerant is condensed, and when the air conditioner 1 performs the heating operation, the refrigerant is evaporated.

The first outdoor heat exchanger control valve 260 is installed at the EHP liquid pipe 240, and controls a flow of the refrigerant to the first outdoor heat exchanger 250.

The four-way valve 270 is an element for switching a path of the refrigerant flowing in the EHP outdoor unit 200.

The GHP outdoor unit 300 is an outdoor unit which is operated in the GHP method, and includes an GHP compressor 310, an oil separator 315, a second accumulator 320, an engine 330, the GHP gas pipe 340, the GHP liquid pipe 345, one pair of connection valves 342 and 346, a cooling water heat exchanger 350, a cooling water pump 355, a second outdoor heat exchanger 360, a second outdoor heat exchanger control valve 365, an auxiliary heat exchanger 370, an auxiliary heat exchanger control valve 375, a second four-way valve 380, a cooling water pipe 391, and a waste heat recovery heat exchanger 392.

The GHP compressor 310 is an element for compressing the refrigerant, and is driven by the engine 330 which will be described later. When a driving force is transmitted to the GHP compressor 310 through the engine 330, the GHP compressor 310 may compress the refrigerant, like the EHP compressor 210.

The GHP compressor 310 may be a horizontal type low-pressure compressor in which a cylinder therein is horizontally installed due to a structural characteristic thereof. The horizontal type low-pressure compressor includes a relatively small oil storage space. Therefore, the oil storage space may be provided at the oil separator 315, and the oil may be supplied to the compressor.

The oil separator 315 is provided at an outlet side of the GHP compressor 310 to separate the oil from the refrigerant discharged from the GHP compressor 310 and then to supply the separated oil to an inlet port of the GHP compressor 310.

The second accumulator 320 is an element for supplying the refrigerant to the GHP compressor 310. Specifically, the second accumulator 320 separates the gaseous refrigerant from the introduced refrigerant, and supplies the gaseous refrigerant to the GHP compressor 310, and may also temporarily store the mixture of the oil and the liquid refrigerant. The liquid refrigerant may be prevented from being suctioned into the GHP compressor 310 by the second accumulator 320.

The engine 330 generates a driving force by burning the gas fuel such as LPG and LNG. And the engine 330 is connected with the GHP compressor 310, and transmits the driving force to the GHP compressor 310. The GHP outdoor unit 300 is operated in the GHP method through a combustion gas from the engine 330.

The engine 330 may further include a governor (not shown).

The governor (not shown) controls an amount of the fuel supplied to the engine 330. Specifically, the governor may be understood as a device which constantly controls an outlet pressure of the fuel and supplies the fuel, regardless of an inlet pressure of the fuel and a change in a flow rate of the fuel.

The GHP gas pipe 340 is an element for connection with the at least one indoor unit 10. Specifically, the GHP gas pipe 340 connects the GHP compressor 310 with the indoor unit gas pipe 12.

The GHP liquid pipe 345 is an element for connection with the at least one indoor unit 10. Specifically, the GHP liquid pipe 345 connects the second outdoor heat exchanger 360 with the indoor unit liquid pipe 14.

The pair of connection valves 342 and 346 are elements for connection with the indoor unit 10. The pair of connection valves 342 and 346 include a connection valve 342 which connects the GHP gas pipe 340 with the indoor unit gas pipe 12, and a connection valve 346 which connects the GHP liquid pipe 345 with the indoor unit liquid pipe 14.

The GHP outdoor unit 300 further includes a cooling water pipe 354 which guides a flow of cooling water for cooling the engine 330. The cooling water pipe 354 may cool the engine 330, while passing through the engine 330.

The cooling water pump 355 for generating a flowing force of the cooling water and a radiator 351 for cooling the cooling water may be installed at the cooling water pipe 354.

The radiator 351 is provided at one side of the second outdoor heat exchanger 360, and the cooling water of the radiator 351 may be heat-exchanged with external air by driving of an outdoor fan 360a, and thus may be cooled in this process.

The cooling water heat exchanger 350 is connected with the cooling water pipe 354. The cooling water flowing passing through the cooling water heat exchanger 350 absorbs heat radiated from the engine 330.

Like the first outdoor heat exchanger 250, the second outdoor heat exchanger 360 is an element for evaporating or condensing the refrigerant according to the cooling and heating operation of the air conditioner 1. Specifically, when the air conditioner 1 performs the cooling operation, the refrigerant is condensed, and when the air conditioner 1 performs the heating operation, the refrigerant is evaporated.

The second outdoor heat exchanger control valve 365 is installed at the GHP liquid pipe 345, and may control a flow of the refrigerant to the second outdoor heat exchanger 360.

The auxiliary heat exchanger 370 is a heat exchanger in which a low pressure refrigerant is heat-exchanged with high temperature cooling water, and may include, for example, a plate type heat exchanger. The cooling water may be cooled, while being heat-exchanged in the auxiliary heat exchanger 370.

The auxiliary heat exchanger control valve 375 is installed at a refrigerant pipe connected to the auxiliary heat exchanger 370, i.e., the GHP liquid pipe 345, and may control a flow of the refrigerant to the auxiliary heat exchanger 370. The GHP liquid pipe 345 which extends to the second outdoor heat exchanger 360 may be branched at one point, and then may extend to the auxiliary heat exchanger 370. The auxiliary heat exchanger control valve 375 and the second outdoor heat exchanger control valve 365 may be installed in parallel.

The second four-way valve 380 is an element for switching a path of the refrigerant flowing in the GHP outdoor unit 300. The second four-way valve 380 is disposed at an outlet side of the oil separator 315, and may be installed at the GHP gas pipe 340. The second four-way valve 380 guides the refrigerant to the second outdoor heat exchanger 360 during the cooling operation, and guides the refrigerant to the indoor unit 10 during the heating operation.

In the waste heat recovery heat exchanger 392, the cooling water which absorbs heat generated by the driving of the engine 330 is heat-exchanged with the refrigerant which is suctioned into the GHP compressor 310. More specifically, in the waste heat recovery heat exchanger 392, the heat generated from the engine 330 may be transferred to the refrigerant introduced into the inlet port of the GHP compressor 310. Therefore, the waste heat recovery heat exchanger 392 may prevent the liquid refrigerant from being introduced into the GHP compressor 310, and thus may prevent the GHP compressor 310 from being damaged.

One side of the waste heat recovery heat exchanger 392 is connected with a refrigerant pipe connected with the inlet port of the GHP compressor 310, and the other side of the waste heat recovery heat exchanger 392 is connected with the cooling water pipe 391 connected with the engine 330.

A second cooling water pump 393 which generates a flowing force of the cooling water in the cooling water pipe 391 may be provided at the cooling water pipe 391.

Oil level sensors 210a and 315a which measure an oil level may be provided at the EHP compressor 210 and the oil separator 315, respectively.

The oil level sensors 210a and 315a may include a first oil level sensor 210a which is installed at the EHP compressor 210, and a second oil level sensor 315a which is installed at the oil separator 315.

Referring to FIG. 3, the air conditioner 1 may further include a control part 50 which controls an RPM or a frequency of each of the GHP compressor 310 and the EHP compressor 210 based on oil level information measured by the oil level sensors 210*a* and 315*a*.

To control the RPM of the GHP compressor 310, the control part 50 may control power or an RPM of the engine 330. And to control the RPM of the EHP 210, the control part 50 may control power or an RPM of the electric motor provided at the EHP compressor 210.

Hereinafter, a method for controlling the air conditioner according to one embodiment of the present discloser will be described in detail.

Figure 4:
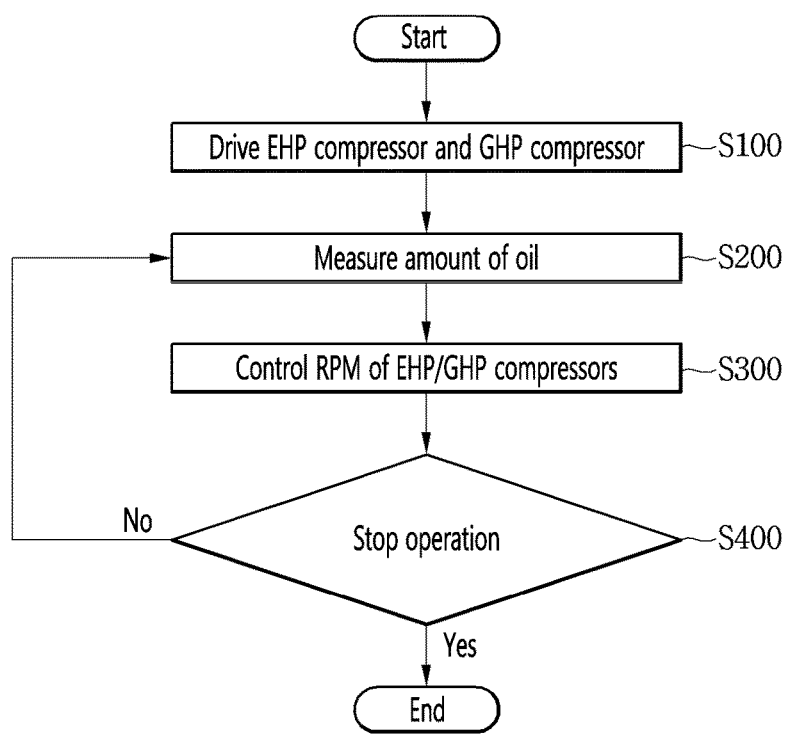
FIG. 4 is a flowchart illustrating a method for controlling the air conditioner according to one embodiment of the present discloser.
Figure 5:
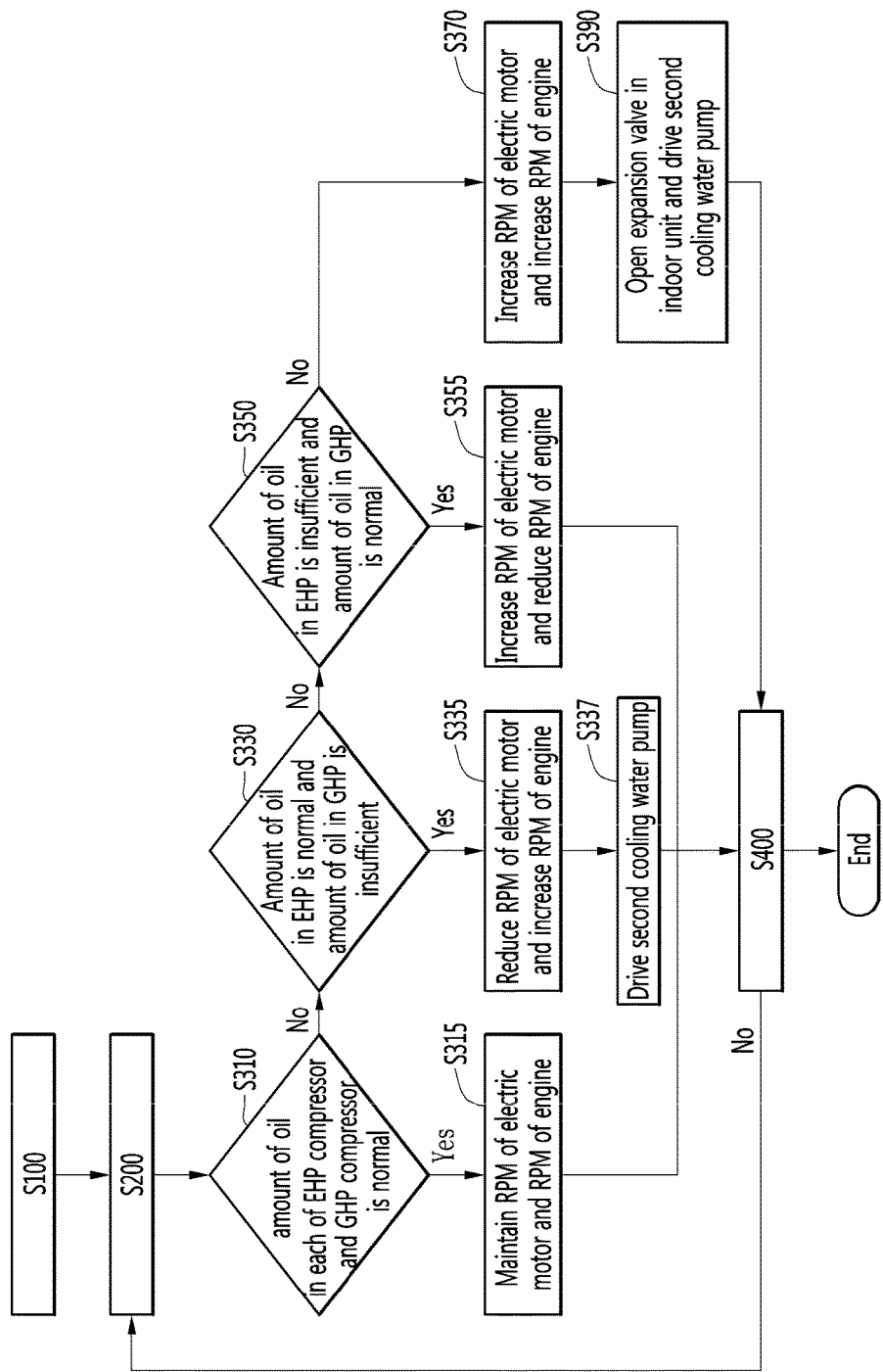
FIG. 5 is a detailed flowchart of an operation of measuring an amount of oil and an operation of adjusting an RPM of a driving source in the method for controlling the air conditioner of FIG. 4.

FIG. 4 is a flowchart illustrating a method for controlling the air conditioner according to one embodiment of the present discloser, and FIG. 5 is a detailed flowchart of an operation of measuring an amount of oil and an operation of adjusting an RPM of a driving source in the method for controlling the air conditioner of FIG. 4.

Referring to FIGS. 4 and 5, the method for controlling the air conditioner includes an operation S100 of driving the EHP compressor 210 and the GHP compressor 310, an operation S200 of measuring an amount of the oil, and an operation S300 of controlling the RPM of each of the EHP compressor 210 and the GHP compressor 310.

In the operation S100 of driving the EHP compressor 210 and the GHP compressor 310, the EHP compressor 210 and the GHP compressor 310 are operated in a heating mode or a cooling mode.

In the operation S200 of measuring the amount of the oil, it is measured and determined whether the amount of the oil in each of the EHP compressor 210 and the oil separator 315 is maintained at a predetermined level. Specifically, the first oil level sensor 210*a* measures the amount of the oil in the EHP compressor 210, and transmits information of the amount of the oil in the EHP compressor 210 to the control part 50. For example, the amount of the oil in the EHP compressor 210 may be compared with a first predetermined value, and the amount of the oil in the oil separator 315 may be compared with a second predetermined value.

The second oil level sensor 310*a* measures the amount of the oil in the oil separator 315, and transmits information of the amount of the oil in the oil separator 315 to the control part 50. The control part 50 may calculate the amount of the oil stored in the GHP compressor 310 based on the information of the amount of the oil in the oil separator 315.

The operation S300 of controlling the RPM of the EHP/GHP compressors 210 and 310 may include an operation of controlling a driving source of the EHP compressor 210, i.e., the power or the RPM of the electric motor and a driving source of the GHP compressor 310, i.e., the power or the RPM of the engine 330, based on the amount of the oil in the EHP compressor 210 and the GHP compressor 310 measured in the operation S200 of measuring the amount of the oil.

First, when the amount of the oil in each of the EHP compressor 210 and the GHP compressor 310 is normal, the control part 50 maintains the RPM of each of the EHP compressor 210 and the GHP compressor 310. That is, the power or the RPM of each of the electric motor and the engine 330 is maintained (referring to S310 and S315).

Then, when the amount of the oil in the EHP compressor 210 is normal, and the amount of the oil in the GHP compressor 310 is insufficient, the control part 50 reduces the RPM of the EHP compressor 210, and increases the RPM of the GHP compressor 310, and thus the amount of the oil introduced into the GHP compressor 310 may be increased. That is, the power or the RPM of the electric motor may be reduced, and the power or the RPM of the engine 330 may be increased (referring to S330 and S335).

By such a control operation, a relatively much more amount of the oil accumulated in the refrigerant pipe may be recovered at a side of the GHP compressor 310 of which the RPM is increased. For example, the refrigerant pipe may include the indoor unit pipes 12 and 14, the EHP pipes 230 and 240 and the GHP pipes 340 and 345.

At this time, the control part 50 may equally control a reduction in the RPM of the EHP compressor 210 and an increase in the RPM of the GHP compressor 310. That is, a reduction in the RPM of the electric motor and an increase in the RPM of the engine 330 may be equally controlled. By such a control operation, an entire operational capacity of the EHP compressor 210 and the GHP compressor 310 may be equally maintained.

For example, the control part 50 may reduce the frequency of the EHP compressor 210 by 1 Hz per second, and may increase the frequency of the GHP compressor 310 by 1 Hz per second. In other words, the control part 50 may reduce the RPM of the electric motor by 1 RPM per second, and may increase the RPM of the engine 330 by 1 RPM per second.

When the RPM of the engine 330 is increased, the liquid refrigerant may be introduced into the GHP compressor 310, and may damage the GHP compressor 310.

Therefore, to prevent the liquid refrigerant from being introduced into the GHP compressor 310, the second cooling water pump 393 is driven so that the cooling water which absorbs the heat of the engine 330 heats the refrigerant introduced into the GHP compressor 310 (referring to S337).

When the amount of the oil in the EHP compressor 210 is insufficient, and the amount of the oil in the GHP compressor 310 is normal, the control part 50 increases the RPM of the EHP compressor 210, and reduces the RPM of the GHP compressor 310, and thus the amount of the oil introduced into the EHP compressor 210 may be increased. In other words, the control part 50 increases the RPM of the electric motor, and reduces the RPM of the engine 330 (referring to S350 and S355).

At this time, the control part 50 may equally control an increase in the RPM of the EHP compressor 210 and a reduction in the RPM of the GHP compressor 310. In other words, an increase in the RPM of the electric motor and a reduction in the RPM of the engine 330 may be equally controlled.

For example, the control part 50 may increase the frequency of the EHP compressor 210 by 1 Hz per second, and may reduce the frequency of the GHP compressor 310 by 1 Hz per second. In other words, the control part 50 may increase the RPM of the electric motor by 1 RPM per second, and may reduce the RPM of the engine 330 by 1 RPM per second.

At this time, the amount of the oil introduced into the EHP compressor 210 may be increased.

Meanwhile, when the amount of the oil in the EHP compressor 210 is insufficient, and the amount of the oil in the GHP compressor 310 is also insufficient, the control part 50 may increase the RPM of the EHP compressor 210 and the RPM of the GHP compressor 310 to increase the amount of the oil introduced into each of the EHP compressor 210 and the GHP compressor 310. In other words, the control part 50 may increase the RPM of the electric motor, and may also increase the RPM of the engine 330. (referring to S370)

At this time, the control part 50 may drive the second cooling water pump 393 to prevent the liquid refrigerant from being introduced into the GHP compressor 310. Also, the control part 50 may open an expansion valve (not shown) provided at the indoor unit 10 to enable the oil distributed in the indoor unit 10 to flow to the EHP compressor 210 and the GHP compressor 310 (referring to S390).

According to the air conditioner and the method for controlling the same according to the present discloser, it is possible to maintain the oil balance between the compressor in the outdoor unit according to the EHP type and the compressor in the outdoor unit according to the GHP type.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
    an indoor unit;
    an EHP outdoor unit connected with the indoor unit to drive an EHP compressor using an electric motor;
    a GHP outdoor unit connected with the indoor unit and including a GHP compressor to operate using power from an engine driven by combustion gas and an oil separator provided at an outlet side of the GHP compressor;
    a first oil level sensor provided at the EHP compressor to detect a first amount of oil;
    a second oil level sensor provided at the oil separator to detect a second amount of oil; and
    a controller configured to control an RPM of the EHP compressor or the GHP compressor based on the detected first and second amounts of oil,
    wherein the controller is configured to compare the amount of oil detected by the first oil level sensor with a first predetermined value and compare the amount of oil detected by the second oil level sensor with a second predetermined value that is the same or different than the first predetermined value,
    wherein when the controller determines that the first amount of oil is less than the first predetermined value, or the second amount oil is less than the second predetermined value, then the controller is configured to increase the RPM of the compressor having the oil level that is less than the first or second predetermined value and decrease the RPM of the other compressor,
    wherein the first and second predetermined values are respectively defined as a sufficient amount of oil such that when the detected first amount of oil is less than the first predetermined value then the detected first amount of oil at the EHP compressor is insufficient as low, and when the detected second amount of oil is less than the second predetermined value then the detected second amount of oil at the GHP compressor is insufficient as low.

2. The air conditioner of claim 1, wherein the controller controls the RPM of the engine to control the RPM of the GHP compressor and controls the RPM of the electric motor to control the RPM of the EHP compressor.

3. The air conditioner of claim 1, wherein when the second amount of oil is less than the second predetermined value, the controller increases the RPM of the GHP compressor and drives a cooling water pump so that a cooling water circulates through the engine.

4. The air conditioner of claim 1, wherein,
    when the first amount of oil is less than or equal to the first predetermined value and the second amount of oil is greater than or equal to the second predetermined value, the controller increases the RPM of the EHP compressor and decreases the RPM of the GHP compressor.

5. The air conditioner of claim 4, wherein the RPM of the EHP compressor is increased the same amount as the RPM of the GHP compressor is decreased.

6. The air conditioner of claim 1, wherein,
    when the first amount of oil is greater than or equal to the first predetermined value and the second amount of oil is less than or equal to the second predetermined value, the controller increases the RPM of the GHP compressor and decreases the RPM of the EHP compressor.

7. The air conditioner of claim 6, wherein the RPM of the GHP compressor is increased the same amount as the RPM of the EHP compressor is decreased.

8. The air conditioner of claim 1, wherein the GHP outdoor unit further comprises:
    a waste heat recovery heat exchanger to heat exchange a cooling water circulated in the engine with a refrigerant that is suctioned into the GHP compressor;
    a cooling water pipe to guide a circulation of the cooling water; and
    a cooling water pump provided at the cooling water pipe.

9. The air conditioner of claim 8, wherein when the second amount of oil is less than the second predetermined value, the controller increases the RPM of the GHP compressor and drives the cooling water pump such that the cooling water is heat-exchanged with the refrigerant in the waste heat recovery heat exchanger.

10. The air conditioner of claim 1, wherein the GHP outdoor unit further comprises:
    an outdoor heat exchanger to heat-exchange a refrigerant with air by an outdoor fan; and
    a radiator installed at a side of the outdoor heat exchanger to heat-exchange a cooling water with the air.

11. The air conditioner of claim 10, wherein the GHP outdoor unit further comprises an auxiliary heat exchanger to heat-exchange a refrigerant flowing to the outdoor heat exchanger with a cooling water.

12. The air conditioner of claim 1, wherein the GHP compressor comprises a horizontal type low-pressure compressor.

13. A method for controlling an air conditioner in which an EHP outdoor unit having an EHP compressor using an electric motor as an EHP driving source and a GHP outdoor unit having a GHP compressor using an engine as a GHP driving source are each connected with an indoor unit, the method comprising:
    driving the EHP compressor and the GHP compressor;
    determining, using a controller, a first amount of oil in each of the EHP compressor and a second amount of oil in the GHP compressor; and
    controlling, using the controller, an RPM of each of the EHP compressor and the GHP compressor based on the determined first and second amounts of oil,
    wherein when the first amount of oil in the EHP compressor is less than a first predetermined value or the second amount of oil in the GHP compressor is less than a second predetermined value, the RPM of the EHP or GHP compressor whose determined amount of oil is less than the respective first and second predetermined values is increased and the RPM of the EHP or GHP compressor whose determined amount of oil is not less than the respective first and second predetermined values is decreased, wherein the first and second predetermined values are respectively defined as a sufficient amount of oil such that when the first amount of oil is less than the first predetermined value then the first amount of oil at the EHP compressor is insufficient as low, and when the second amount of oil is less than the second predetermined value then the second amount of oil at the GHP compressor is insufficient as low.

14. The method of claim 13, wherein the controlling of the RPM comprises reducing the RPM of the electric motor and increasing the RPM of the engine when the first amount of the oil is greater than or equal to the first predetermined value and the second amount of the oil is less than the second predetermined value.

15. The method of claim 14, further comprising transferring heat generated from the engine to a refrigerant being suctioned into the GHP compressor.

16. The method of claim 13, wherein the controlling of the RPM comprises increasing the RPM of the electric motor and reducing the RPM of the engine when the first amount of the oil is less than the first predetermined amount and the second amount of the oil is greater than or equal to the second predetermined amount.

17. The method of claim 13, wherein the controlling of the RPM comprises increasing the RPM of the electric motor and increasing the RPM of the engine when the first amount of the oil is less than the first predetermined amount and the second amount of the oil is less than the second predetermined amount.

18. The method of claim 17, further comprising driving a cooling water pump to prevent a liquid refrigerant from being introduced into the GHP compressor.

19. The method of claim 18, further comprising opening an expansion valve provided at the indoor unit to enable oil in the indoor unit to flow to the EHP compressor and the GHP compressor.

20. The method of claim 13, wherein the controlling the RPM comprises increasing the RPM of the engine and/or the electric motor so that the first amount of the oil and/or the second amount of oil is respectively increased.

\* \* \* \* \*